Aug. 15, 1939.  A. V. HAMMER  2,169,642

MACHINE FOR TREATING FATS

Filed Nov. 3, 1937

A. V. Hammer
INVENTOR

Glascock Downing & Seebold
ATTYS.

Patented Aug. 15, 1939

2,169,642

UNITED STATES PATENT OFFICE 2,169,642

MACHINE FOR TREATING FATS

Axel Victor Hammer, Copenhagen, Denmark

Application November 3, 1937, Serial No. 172,597

5 Claims. (Cl. 99—244)

My invention relates to machines for treating fats, such as margarine and natural butter, and more particularly to such machines in which the product to be treated is carried axially through a casing by means of a conveyor, e. g., a conveyor worm, serving to press the product through one or more sets of resistance members carrying kneading elements for mixing and blending the product in order to obtain a suitable consistence of the same, one of the resistance members in each set being stationary and the other being rotatable, e. g., by being secured to the conveyor worm shaft.

In machines of this type it is customary to use resistance members in the shape of perforated or grid-shaped plates arranged perpendicularly to the axis of casing.

In the application of such machines it sometimes happens that the treated product becomes a veined appearance. I have discovered that this is due to the fact, that the mutual velocity of the kneading elements on the resistance members varies from the axis towards the casing wall so that the product is more thoroughly worked at the latter place thereby attaining a more light colour. When the lighter and darker parts are carried along through the machine without being materially intermingled and are finally stretched in its discharge nozzle the product will be veined. It is the object of my invention to avoid this drawback without materially altering the general construction of the machine.

According to my invention this is obtained by so arranging the resistance members that the product does not pass the kneading elements in a path mainly parallel to the machine axis. Thus the said members may form between them a passageway of curved configuration and the kneading elements may be arranged at last partly in the said passageway, preferably in a part thereof forming an angle with the axis.

Figure 1:
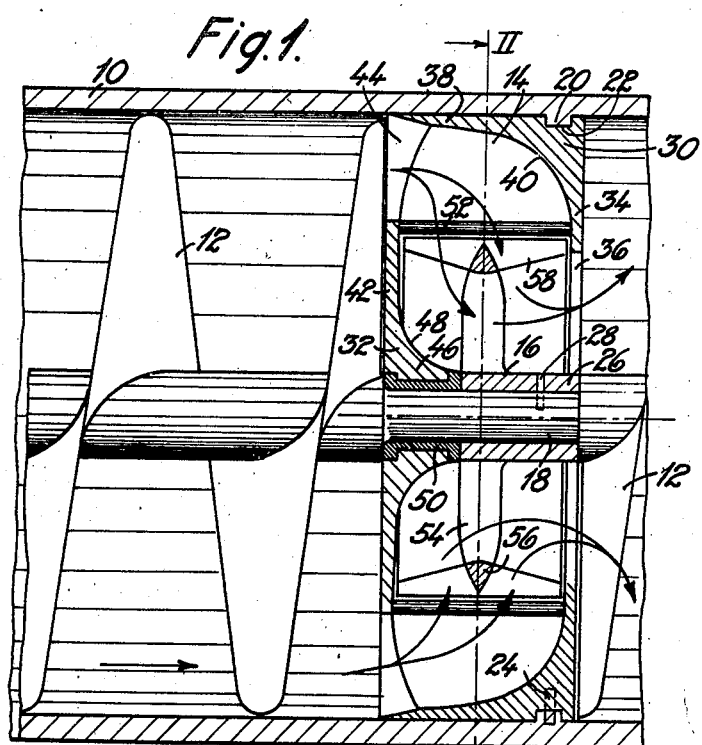
Figure 2:
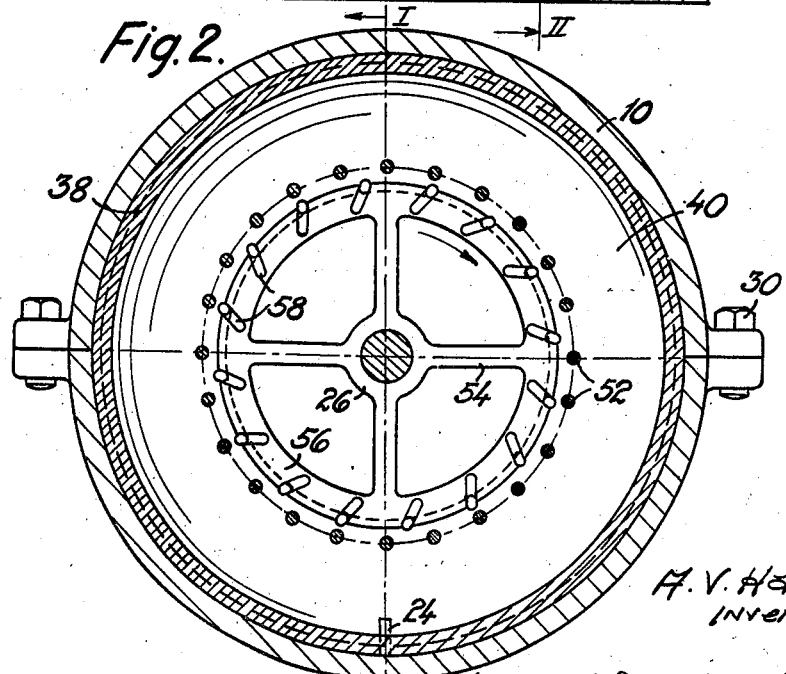

In the following specification the invention will be more exactly described with reference to the accompanying drawing, in which Figure 1 is a longitudinal section of a part of a kneading machine on the line I—I in Figure 2, and Figure 2 is a cross-section of the same on the line II—II in Figure 1.
The machine comprises a cylindrical casing 10 in which is arranged a rotatable conveyor worm 12 journalled in a suitable manner co-axially in the casing. In the embodiment shown the conveyor worm is divided in a number of sections, two of which are shown partly in Figure 1. Between these sections is provided a set of resistance members embodying a stationary member 14 secured in the casing 10 and a rotatable member 16 secured to a reduced portion 18 of the conveyor worm shaft. The member 14 is held in a fixed position in the casing 10, e. g., by means of an annular rib 20 at the inner surface of the casing intermeshing with an annular notch 22 in the member 14, rotation of the said member being prevented by a pin 24. The member 16 has a central hub 26 surrounding a part of the reduced portion 18 of the shaft and is secured thereto by means of a pin 28. Both members 14 and 16 may be divided along a plane through the axis so that they can be assembled between the conveyor worm sections. Also the casing 10 may be divided in a similar manner as shown in Figure 2 and the two parts thereof may be clamped together by bolts 30.

The member 14 consists of two parts 30 and 32 forming together a unit produced e. g. by casting. This unit as a whole is arranged as a partition in the casing 10. The part 30 forms an end wall 34 with a relatively great central aperture 36 and a flange 38 along the inner surface of the casing 10. The inner surfaces of the wall 34 and the flange 38 are curved and form together a uniformly curved surface 40. The part 32 forms another end wall 42 connected to the flange 38 by a number of, say four, ribs 44 forming between them a corresponding number of peripherical apertures. The central part of the part 32 is shaped as a boss 46 forming a curved transit 48 from the inner surface of the end wall 42 to the outer surface of the hub 26 of the member 16. The boss 46 surrounds a part of the reduced portion 18 and carries a journal bearing 50 for the same.

Between the end walls 34 and 42 and in a radial distance from the axis between the edges of the central aperture 36 in the first named wall and the peripherical apertures in the last named wall is arranged a circular row of pins 52 forming stationary kneading elements. These pins are arranged in axial direction in suitable mutual distances as it appears from Figure 2.

The resistance members 14 and 16, viz., the parts 34, 38, 42, 46, and 26 thereof, form together a curved passageway as indicated by curved arrows in Figure 1. In cross-section this passageway, generally, has the shape of an S and the general shape of the passageway as a whole can be obtained by turning this S about the machine axis to describe a surface of revolution.

The resistance member 16 is shaped as a wheel having the hub 26, spokes 54 and a rim 56. This latter carries a circular row of blades 58 arranged in axial direction adjacent the pins 52 as it appears from Figure 2. The blades 58 project at both sides from the rim 56 and have decreasing height towards their ends. Each blade is arranged in an inclined position relatively to the radius from the center of the wheel to the blade in question, vide Figure 2. The outer and the inner edges of the blades 58 are rounded.

During the operation of the machine the product to be treated, e. g. margarine mass, is carried axially through the casing 10 by the conveyor worm 12 as indicated by a horizontal arrow in Figure 1. At each set of resistance members 14 and 16 the movement of the mass is checked so that ahead of said members the mass forms a compact body which by the pressure of the worm 12 is forced through the curved passageway between the resistance members. In this passage the mass is turned over as its direction of movement shifts from axial to radial and again to axial direction so that the mass portions being outermost at the entrance to the resistance members will not be outermost at the exit therefrom. In the passageway the mass is kneaded by the kneading elements 52 and 58 by being divided up in thin bands, cut and rolled out by the mutual movement of the elements. As the elements 52 and 58 are arranged parallelly to the axis their mutual velocity is the same at both ends so that the kneading action will be uniform in the whole length of the elements.

Thus by the resistance members and kneading elements according to my invention is secured firstly a thorough blending of the mass and secondly a uniform working of the same.

It is to be understood that my invention is not restricted to the special embodiment shown and described as the same may be altered in various ways without departing from the spirit of my invention. I specially wish to point out that a machine of the kind set forth may contain one or more sets of resistance members and that these may be arranged between consecutive sections of the conveyor worm and at the end of the same. Alternatively one such set or more spaced sets may be arranged solely at the discharge end of a unitary conveyor worm.

Having thus fully described my invention, I claim as new and desire to secure by Letters Patent:

1. In a machine for treating fats, a tubular casing, a conveyor worm by which the product to be treated is carried lengthwise through the casing, at least one set of stationary members inserted as a partition in the casing and comprising spaced transverse walls having a number of peripheral apertures and a central aperture respectively, a circular row of kneading elements arranged substantially in axial direction between the peripheral aperture and the central aperture in the space between the transverse walls, and a wheel shaped member arranged on the conveyor worm shaft and carrying at its circumference a row of kneading elements spaced from the first named kneading elements.

2. In a machine for treating fats, a tubular casing through which the product to be treated is carried lengthwise, a number of pins arranged substantially in axial direction, a solid partition wall connected to one end of the said pins and extending to the casing wall, another solid partition wall connected to the other end of said pins and extending towards the axis, and a rotatable member carrying a number of blades spaced from the pins and adapted for co-operating with the latter to work the fat.

3. In a machine for treating fats, a tubular casing, conveyor means by which the product to be treated is carried through the casing lengthwise from end to end, at least one set of partition members inserted in the casing and forming between them a passageway of curved configuration, said passageway opening into the adjoining parts of the casing by a number of peripheral apertures and a central aperture, respectively, and mutually spaced sets of kneading elements arranged in a part of the passageway forming an angle with the axis.

4. In a machine for treating fats, a casing, conveyor means by which the products to be treated is carried through the casing lengthwise from end to end, at least one set of members arranged in the casing and adjoining the conveyor means, said members forming between them a curved passageway with co-axial inlet and outlet and comprising a stationary member carrying a number of kneading elements, and a rotatable member carrying kneading elements spaced from the first named elements and adapted for cooperating with the latter to work the fat.

5. In a machine for treating fats according to claim 4, wherein the kneading elements comprise a circular row of pins cooperating with a circular row of blades arranged in an inclined manner relative to the radius.

AXEL VICTOR HAMMER.